United States Patent Office 3,313,782
Patented Apr. 11, 1967

3,313,782
PRODUCTION OF LINEAR POLYCARBONATES BY THE REACTION OF A 1,3-DIOXOLANONE-2 WITH A DIHYDROXY COMPOUND
Hermann Springmann and Wilhelm Dietrich, Marl, Germany, assignors to Chemische Werke Hüls Aktiengesellschaft, Recklinghausen, Germany
No Drawing. Filed Apr. 30, 1964, Ser. No. 363,991
Claims priority, application Germany, May 9, 1963, C 29,891
8 Claims. (Cl. 260—77.5)

This invention relates to the preparation of polycarbonates, more particularly, to high molecular weight polymers produced from 1,3-dioxolanones and polyhydric compounds.

It is known that polycarbonates can be produced by ester interchange of diesters of carbonic acid with dihydroxy-compounds, or of bis-alkyl- or aryl-carbonates of hydroxy compounds with themselves or with other dihydroxy compounds.

It is also known that polycarbonates can be produced by reaction of dihydroxy compounds with phosgene or of bis-chloro-carbonic-acid-esters of dihydroxy compounds in the presence of acid binding agents.

These methods have the disadvantage that for the production of the carbonic acid or chloro-carbonic-acid-esters, poisonous phosgene must be used, which necessitates special safety precautions. Furthermore, in processes which are performed in the presence of acid binding materials there is involved the formation of salts which removal thereof requires an additional procedure.

It is also known that cyclic carbonates such as ethylene carbonate, if desirable with 1,2-epoxides, can be converted in the presence of small amounts of polyvalent alcohols at higher temperatures and under increased pressures into liquid-to-viscous polycarbonates of relatively low molecular weight. By that process only low molecular weight linear polycarbonates are produced.

A principal object of this invention, therefore, is to provide an improved process for the production of relatively high molecular weight linear polycarbonates.

Upon further study of the specification and claims other objects and advantages of the present invention will become apparent.

These objects are attained by the discovery that high molecular weight polycarbonates can be produced by heating a 1,3-dioxolanone with at least a stoichiometric amount of an aliphatic, non-aromatic cycloaliphatic or araliphatic dihydroxy compound in the presence of a basic catalyst while simultaneously removing the formed glycol by-product from the reaction mixture. A particularly preferred and simple technique is to conduct the polymerization reaction in the sump of a distillation apparatus whereby the glycol which was produced from the 1,3-dioxolanone in the reaction mixture is continuously distilled off.

As the 1,3-dioxolanone, there can be employed a compound of the formula

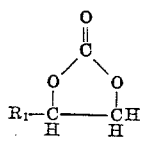

wherein $R_1$ is either hydrogen or alkyl of 1-2 carbon atoms.

It is most preferred to use ethylene carbonate, although the higher homologues such as propylene or butylene carbonate are also particularly suitable. The production of these 1,3-dioxolanones is accomplished in a simple manner by reaction of the corresponding 1,2-epoxides with carbon dioxide.

As the dihydroxy reactant, there can be employed compounds of the formulae (A)  
HO—$R_2$—OH wherein $R_2$ is an aliphatic moiety, preferably alkyl of 3 to 12 carbon atoms, preferred compounds being 2,2-dimethyl-propane-diol-1,3; 2,2-diethyl-propane-diol-1,3, dodecane-diol-1,12.

(B)  
HO—$R_3$—OH wherein $R_3$ is a non-aromatic cycloaliphatic moiety, preferably cycloparaffin-dialkyl, wherein the cycloparaffin portion contains 4 to 12 carbon atoms, and each alkyl portion 1 to 2 carbon atoms, preferred specific compounds being 1,4-dimethylol-cyclohexane, 2,2-bis-(4-cyclohexanol)-propane, bis-hydroxymethyl-($x$,8)-tricyclo-[5,21, 0$^{2.6}$]decane, wherein $x$ is 3, 4 and 5, 2-hydroxymethyl-($y$)-hydroxy-bicyclo[2,2,1]heptane, wherein $y$ is 5 and 6, tricyclo[5,2,1,0$^{2,6}$]-decanediol-(8,$z$) wherein $z$ is 3, 4 and 5, spiro[5,5]-[2,4,8,10]-tetraoxo-3,9-bis-hydroxymethyl-undecane.

(C)  
HO—$R_4$—OH wherein $R_4$ is an araliphatic moiety, preferably hydrocarbon-aryl dialkyl wherein the hydrocarbon aryl portion contains 6 to 12 carbon atoms, and each alkyl portion 1 to 4 carbon atoms, preferred specific examples being xyleneglycol, 2,2 bis(4-hydroxyphenyl)-propane reacted with 1–4 moles ethylenoxide.

The dihydroxy compounds and the 1,3-dioxolanones are used in at least stoichiometric amounts. It is, however, advantageous to use an excess of 1,3-dioxolanones, a 3- to-10-fold excess having been found most suitable. The excess 1,3-dioxolanone-2 then functions as a solvent for the polymer.

As basic catalysts the alkali metal carbonates or acetates, zinc oxide, as well as the alkali metal salts of the higher fatty acids, sodium acetate and sodium or potassium palmitate are most suitable. Each catalyst known for ester interchange can be used. Sodium or potassium palmitate are preferred; these soluble catalysts may remain dissolved in the polymers.

The catalysts are generally used in amounts of 0.01 to 0.5, preferably from 0.02 to 0.05 percent by weight, based on the mixture of 1,3-dioxolanone and dihydroxy compounds.

The reaction temperature is limited by the boiling points of the 1,3-dioxolanone used. Therefore this temperature must be lower than the boiling point of the 1,3-dioxolanone, but high enough to distill off the glycol formed.

Performing the reaction under normal pressure small amounts of CO are formed.

The reaction is therefore desirably performed under reduced pressure. With reaction temperatures of 105 to 180° C., for example, the pressure is generally from 0.2 to 50 torr, preferably 7 to 30 torr (1 torr=1 mm. Hg absolute).

If, for example, 1,4-dimethylol-cyclohexane is used, the reaction temperature will be from 105 to 180° C., preferably 125 to 130° C.

The process is generally performed by heating the mixture of the 1,3-dioxolanone and the dihydroxy compound in the presence of a basic catalyst and under reduced pressure, preferably in a distillation column under reflux. After a few hours the glycol is taken off from the head of the column, accompanied by some of the excess 1,3-dioxolanone.

As soon as no more glycol is formed, which will be indicated by an increase of temperature at the column head, any remaining excess of 1,3-dioxolanone is distilled off. There will then remain only the pure colorless polycarbonate which can be poured out while warm, and upon cooling will congeal into a clear resin. The reaction runs to completion and the yield is equal to the theoretical.

The polycarbonates thus produced have a linear structure with a molecular weight of at least 10,000, preferably 20,000 to 50,000. They are especially suitable for the production of films, filaments, and coatings such as lacquers, for which the previously produced polycarbonates were not suitable. If desired, these polycarbonates by virtue of their free hydroxyl groups can form copolymers with diisocyanates, acid anhydrides and epoxides. The polycarbonates produced in this manner are not readily flammable and are of high stability against UV-light.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatosever.

EXAMPLE 1

142 g. 1,4 - dimethylol - cyclohexane (1 mol) (cis: trans=30:70) are reacted with 265 g. ethylene carbonate (3 mols) and 0.2 g. anhydrous sodium acetate 4 hours at a sump temperature of 120–130° C. The resulting glycol is at the same time distilled off from a 0.7 m. high column under 7 mm. Hg. Then during another 2 hours at about 150° C. sump temperature and under 30 mm. Hg, a mixture of glycol and the excess of ethylene carbonate is distilled off. After about 230 g. have been distilled off, there remains a residue of 170 g. clear and odorless resin.

Softening point (Kramer-Sarnow) _____ 98° C.
Reduced viscosity _____ 0.28
K-value [1] _____ 48.0
Mol. wt. (by light scattering) _____ 22,000

[1] The K-value means a value of the average polymerization degree of a polymer (Fikentscher, Kolloid-Zeitschrift, vol. 49, p. 135 (1929), Cellulosechemie, vol. 13, p. 58 (1932)).

The product is soluble in acetone, benzene, xylene, dioxane, butyl acetate and tetrachlorethane. It is insoluble in water and methanol.

EXAMPLE 2

120 g. 2,2-bis-(4-cyclohexanol)-propane (0.5 mol.) and 132 g. ethylene carbonate (1.5 mols.) are mixed with 0.01 g. sodium palmitate and are heated 25 hours at a sump temperature of 130 to 135° C. under 15 mm. Hg pressure. The glycol that is produced is distilled off from a 0.7 mm. column together with some ethylene carbonate. The sump temperature is then raised to 190° C. and the residual ethylene carbonate distilled off under 0.2 mm. Hg.

The yield is 141 g. clear odorless resin with a softening point of 137° C. (Kramer-Sarnow).

Mol. wt. (about) _____ 50,000
K-value _____ 26.0
Reduced viscosity _____ 0.19

EXAMPLE 3

568 g. 2-hydroxymethyl-5-hydroxy-bicyclo-[2,2,1]heptane (4 mols.) are reacted with 352 g. ethylene carbonate (4 mols.) and 0.02 g. sodium palmitate 3 hours at a sump temperature of 145–150° C. The resulting glycol is at the same time distilled off under 50 mm. Hg, then another 352 g. (4 mols.) ethylene carbonate are added heating the mixture for 36 hours; the excess of ethylene carbonate is distilled off under 0.2 mm. Hg. The remaining residue (683 g.) is a colorless brittle resin, having a softening point of 110° C. and a K-value of 24.2. This resin is soluble in benzene, ethyl acetate, and methylethylketone.

EXAMPLE 4

168 g. (1 mol.) tricyclo$[5,2,1,0^{2,6}]$decanediol(4,8) are reacted with 88 g. (1 mol.) ethylene carbonate and 0.01 g. sodium palmitate 7 hours at a sump temperature of 150–155° C. under 50 mm. Hg and distilling off at the same time the resulting glycol. Adding another 88 g. ethylene carbonate the reaction mixture is heated under the same conditions 16 hours. Distilling off the excess of ethylene carbonate under reduced pressure there remains a residue of 193 g. brittle light yellow resin.

Softening point _____ 105° C.
K-value _____ 17.5

Soluble in methylethylketone, benzene and ethylacetate.

The preceding examples can be repeated using the generically and specifically disclosed reactants, catalysts, and reaction conditions with similar results.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of linear, high molecular weight polycarbonates, which process comprises polymerizing a 1,3-dioxolanone-2 of the formula

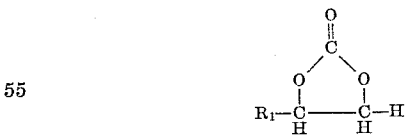

wherein $R_1$ is selected from the group consisting of hydrogen and alkyl of 1–2 carbon atoms, with a dihydroxy compound of the formula

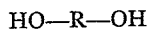

HO—R—OH wherein R is selected from the group of radicals consisting of aliphatic, non-aromatic cycloaliphatic and araliphatic, and simultaneously removing formed glycol by-products, said polymerizing being conducted in contact with a basic polymerization catalyst capable of catalyzing ester interchange reactions, there being a stoichiometric molar excess of 1,3-dioxolanone-2 over the dihydroxy compound.

2. The process of claim 1, wherein the glycol by-product is removed by distilling it from the reaction mixture under less than atmospheric pressure.

3. The process of claim 1, wherein the polymerization catalyst is selected from the group consisting of an alkali metal carbonate, an alkali metal acetate, an alkali metal salt of a higher fatty acid, and zinc oxide.

4. The process of claim 1, wherein the 1,3-dioxolanone-2 is ethylene carbonate.

5. The process of claim 1, wherein the dihydroxy compound is 1,4-dimethylol-cyclohexane.

6. The process of claim 3, wherein the 1,3-dioxolanone-2 is ethylene carbonate.

7. The process of claim 3 wherein the dihydroxy compound is 1,4-dimethylol-cyclohexane.

8. The process of claim 3, wherein the 1,3-dioxolanone-2 is ethylene carbonate and the dihydroxy compound is 1,4-dimethylol-cyclohexane.

References Cited by the Examiner

UNITED STATES PATENTS

| 2,210,817 | 8/1940 | Peterson | 260—77.5 |
| 2,789,509 | 4/1957 | Reynolds et al. | 260—77.5 |
| 2,789,968 | 4/1957 | Reynolds et al. | 260—77.5 |
| 2,901,466 | 8/1959 | Kibler et al. | 260—77.5 |
| 3,074,962 | 1/1963 | Anderson | 260—340.2 |
| 3,157,622 | 11/1964 | Goldberg | 260—77.5 |

FOREIGN PATENTS 1,182,439   1/1959   France.

SAMUEL H. BLECH, *Primary Examiner.*